( 12 ) United States Patent
Iguchi et al.

(10) Patent No.: US 8,190,208 B2
(45) Date of Patent: May 29, 2012

(54) BASE STATION

(75) Inventors: Michio Iguchi, Yokohama (JP); Shiro Mazawa, Fujisawa (JP); Yosuke Takahashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 596 days.

(21) Appl. No.: 12/277,467

(22) Filed: Nov. 25, 2008

(65) Prior Publication Data

US 2009/0135763 A1    May 28, 2009

(30) Foreign Application Priority Data

Nov. 26, 2007   (JP) .................. 2007-304561

(51) Int. Cl.
*H04B 1/38* (2006.01)
*H04W 72/00* (2009.01)
(52) U.S. Cl. ..................... 455/561; 455/452.2
(58) Field of Classification Search ............. 455/456.5, 455/561
See application file for complete search history.

(56) References Cited

U.S. PATENT DOCUMENTS

| 5,828,661 | A  | * | 10/1998 | Weaver et al. ............... 370/331 |
| 6,359,901 | B1 | * | 3/2002  | Todd et al. .................... 370/465 |
| 6,807,426 | B2 | * | 10/2004 | Pankaj ......................... 455/453 |
| 2006/0209674 | A1 | | 9/2006 | Chen et al. |
| 2008/0229168 | A1 | | 9/2008 | Murakami et al. |

FOREIGN PATENT DOCUMENTS

| JP | 2004-511995 | 4/2004 |
| JP | 2004-153776 | 5/2004 |
| JP | 2004-153777 | 5/2004 |
| JP | 2004-153778 | 5/2004 |
| JP | 2004-153775 | 5/2005 |
| JP | 2006-148490 | 6/2006 |
| WO | WO 2006/057195 | 6/2006 |

* cited by examiner

*Primary Examiner* — Nick Corsaro
*Assistant Examiner* — Joel Ajayi
(74) *Attorney, Agent, or Firm* — Antonelli, Terry, Stout & Kraus, LLP.

(57) ABSTRACT

The present invention can be achieved by a base station in which a terminal is accommodated and the terminal is communicated with another terminal, and which includes: a data rate operation/management unit which operates and stores a time-averaged data rate Rave of the terminal; a threshold value operation/management unit which obtains a current communication data rate R of the terminal to operate and store R/Rave; and a delay management unit which controls to reduce delay on the basis of the R/Rave.

4 Claims, 6 Drawing Sheets

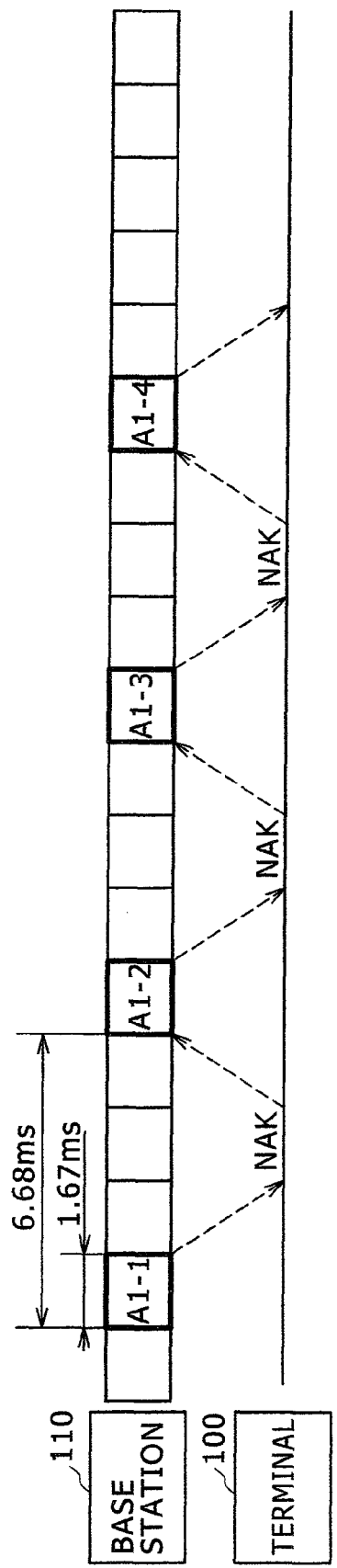

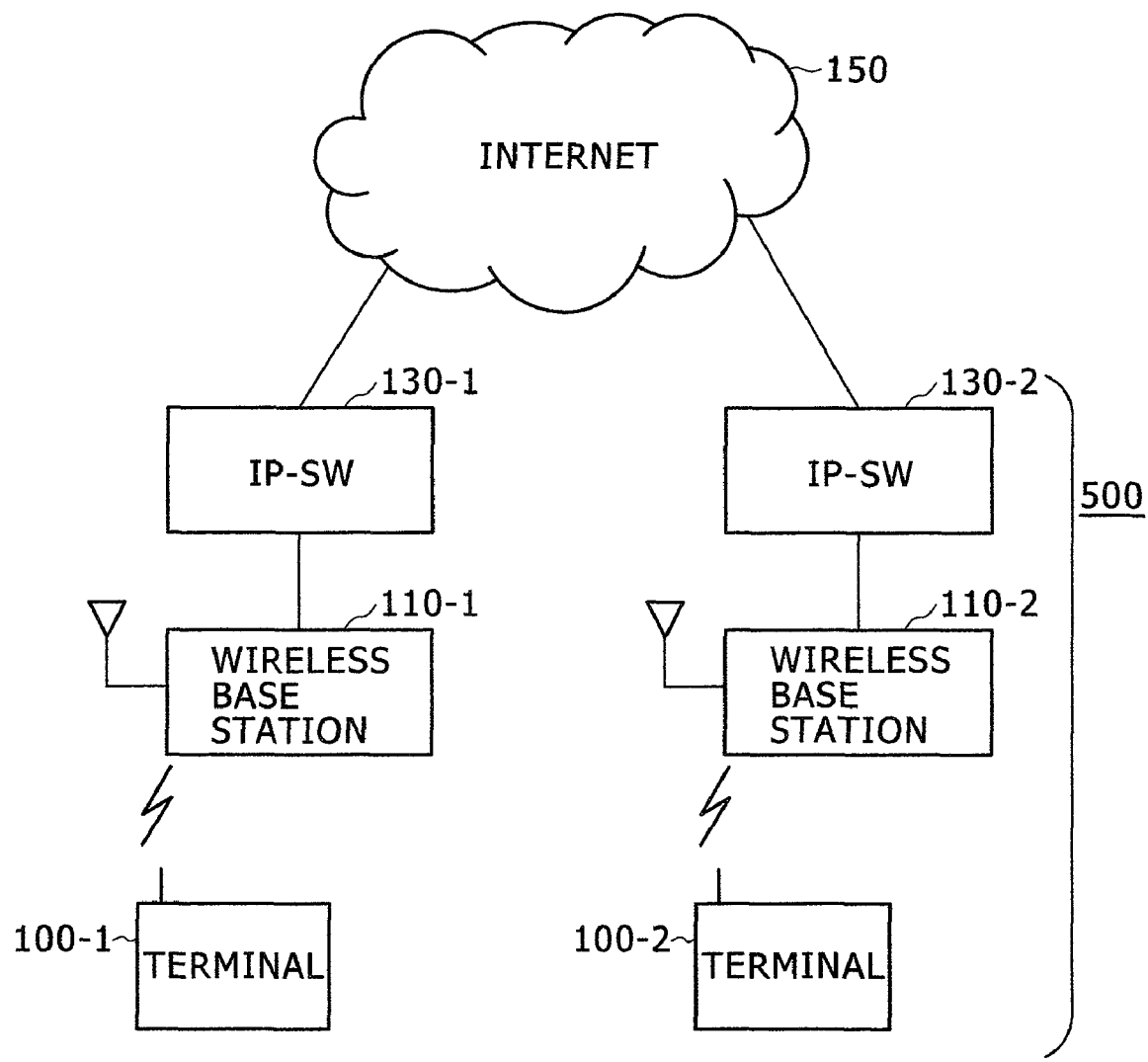

BASE STATION

CLAIM OF PRIORITY

The present application claims priority from Japanese patent application serial no. 2007-304561, filed on Nov. 26, 2007, the content of which is hereby incorporated by reference into this application.

BACKGROUND OF THE INVENTION

The present invention relates to a base station, and particularly to a base station from which wireless data of VoIP are transmitted to a terminal.

As a voice calling system using data communications, Voice over IP (VoIP) is given. The VoIP is a technique by which voice as an analog signal is converted into a digital signal to be IP packetized, so as to make a call using an IP network such as the existing Internet. In making a call using the VoIP, it is important to secure the quality of voice and to reduce a delay time. To secure the quality of voice and to reduce a delay time are also important in providing VoIP services using a wireless data communication system.

In a wireless data communication system, a wireless base station transmits data while changing a communication data rate in accordance with conditions of wireless environment where a user terminal utilizing data communication services is located. In general, the data is transmitted at a high data rate to a user terminal which is located in a good wireless environment. On the contrary, the data is transmitted at a low data rate to a user terminal which is located in a bad wireless environment. By appropriately changing the communication data rate, the data can be transmitted to the user terminal with high probability.

As described above, the communication data rate between the base station and the terminal differs in the wireless data communication system depending on the conditions of wireless environment where the terminal is located. In this case, the number of data slots necessary for transmitting one packet differs in accordance with the communication data rate. In general, in the case where data communications are performed at a low data rate, the number of necessary data slots is increased.

With reference to FIGS. 1, 2A and 2B, there will be described a relation between the data rate and the number of necessary slots. Here, FIG. 1 is a diagram for explaining a configuration of a voice packet and the number of slots. Further, FIGS. 2A and 2B are diagrams, each explaining slot assignment.

In FIG. 1, a voice packet 1 is modulated with a modulation signal, and is assigned to slots 1-1 to 1-n. When the data rate of the modulation signal is 153.6 kbits/s, n is 4. Further, when the data rate of the modulation signal is 38.4 kbits/s that is one-fourth of 153.6 kbits/s, n is 16 that is four times of 4. Specifically, when the communication data rate is 153.6 kbits/s, the packet is assigned to 4 slots. When the communication data rate is 38.4 kbits/s, the packet is assigned to 16 slots.

FIG. 2A shows slot assignment in the case where the communication data rate is 153.6 kbits/s. In addition, FIG. 2B shows slot assignment in the case where the communication data rate is 38.4 kbits/s. In FIGS. 2A and 2B, one slot has 1.67 ms of time in a 1×Evolution Data Only (1×EV-DO) system, and the slots are transmitted with an interval of three slots from the time one slot is transmitted to the time the next slot of the same voice packet is transmitted. Thus, it takes 6.68 ms (1.67 ms×four slots). Therefore, in the case of a low data rate such as 38.4 kbits/s in FIG. 2B, it takes up to 106.88 ms (=1.67 ms×4×16) to transmit voice data of one packet, so that delay occurs.

As described above, when the number of data slots to transmit one packet is increased, delay occurs. In the case where delay is increased at the time of using VoIP, there is a problem such as difficulty of hearing voice. Further, an increase in the number of slots used decreases the number of available users.

SUMMARY OF THE INVENTION

The present invention is to reduce delay caused when wireless environment where a terminal is located deteriorates.

The above-described object can be achieved by a base station in which a terminal is accommodated and the terminal is communicated with another terminal, and which includes: a data rate operation/management unit which operates and stores a time-averaged data rate Rave of the terminal; a threshold value operation/management unit which obtains a current communication data rate R of the terminal to operate and store R/Rave; and a delay management unit which controls to reduce delay on the basis of the R/Rave.

As a first concrete method, the wireless base station manages a determination index for each terminal, and determines whether or not the wireless environment of the terminal deteriorates, by using a current data rate and the index. In the case where the wireless environment deteriorates, the wireless base station skips and discards packets which are supposed to be transmitted to the terminal, prior to a process of signal conversion in the wireless base station. Accordingly, although the voice is interrupted, delay is reduced.

As a second method, the wireless base station assigns packets to slots in accordance with the data rate of the terminal and transmits the same. At this time, the wireless base station manages a determination index for each terminal, and determines whether or not the wireless environment of the terminal deteriorates, by using a current data rate and the index. In the case where the wireless environment of the terminal deteriorates, the wireless base station terminates the transmission of the slots during the transmission process, and assigns the resource left by terminating the transmission of the slots, to transmission of the next slot or other users. Accordingly, although the voice is interrupted, delay is reduced.

As a third method, in a demodulation process of the slots transmitted from the wireless base station is performed at the terminal, when a packet with a larger sequence number can be demodulated first, the wireless base station terminates transmission of data with a smaller sequence number. Accordingly, although the voice is interrupted, delay is reduced.

BRIEF DESCRIPTION OF THE DRAWINGS

Preferred embodiments of the present invention will now be described in conjunction with the accompanying drawings, in which;

FIG. 2A is a diagram for explaining slot assignment in the case where a communication data rate is 153.6 kbits/s;

FIG. 3 is a block diagram of a 1×EV-DO system;

DESCRIPTION OF THE PREFERRED EMBODIMENTS

Figure 1:
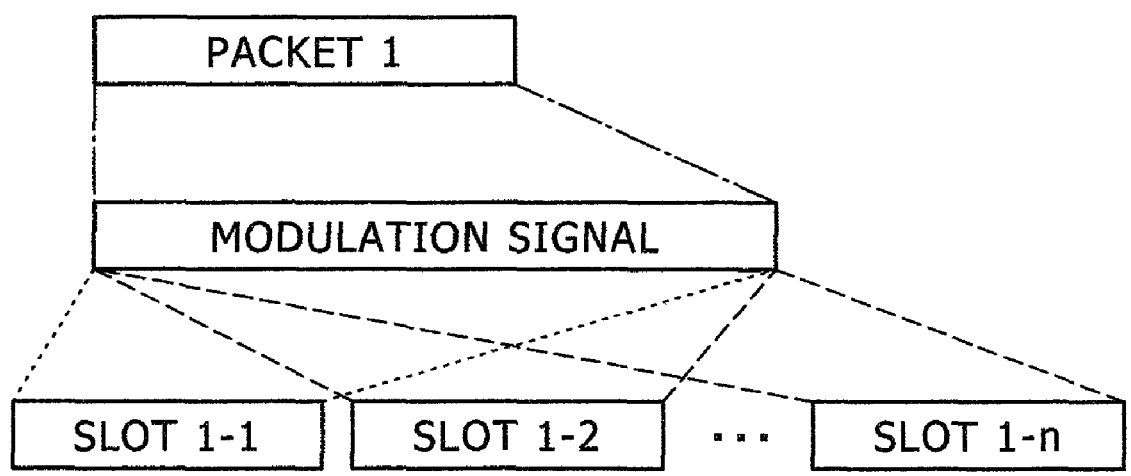
FIG. 1 is a diagram for explaining a configuration of a voice packet and the number of slots.
Figure 2B:
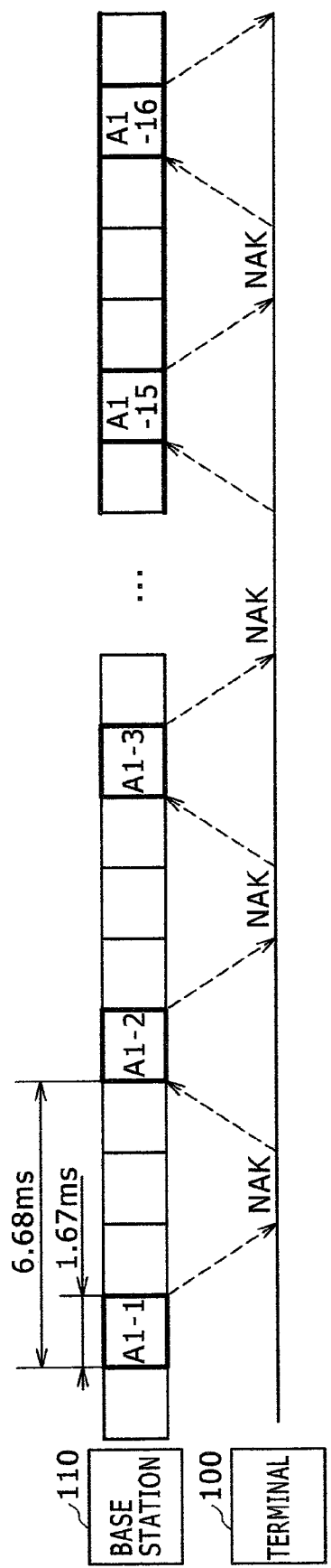
FIG. 2B is a diagram for explaining slot assignment in the case where a communication data rate is 38.4 kbits/s.

Hereinafter, embodiments of the present invention will be described with reference to the drawings. It should be noted that substantially the same constituent elements are given the same reference numerals, and the explanations thereof will not be repeated.

[First Embodiment]

A 1×EV-DO system as a wireless data communication system will be described with reference to FIG. 3. Here, FIG. 3 is a block diagram of the 1×EV-DO system.

In FIG. 3, a 1×EV-DO system 500 includes terminals 100-1 and 100-2, wireless base stations 110-1 and 110-2, and IP Switches (IP-SWs) 130-1 and 130-2. The terminal 100-1 is accommodated in the base station 110-1. In addition, the terminal 100-2 is accommodated in the base station 110-2. It should be noted that the IP-SWs 130 are connected to the Internet 150.

Figure 4:
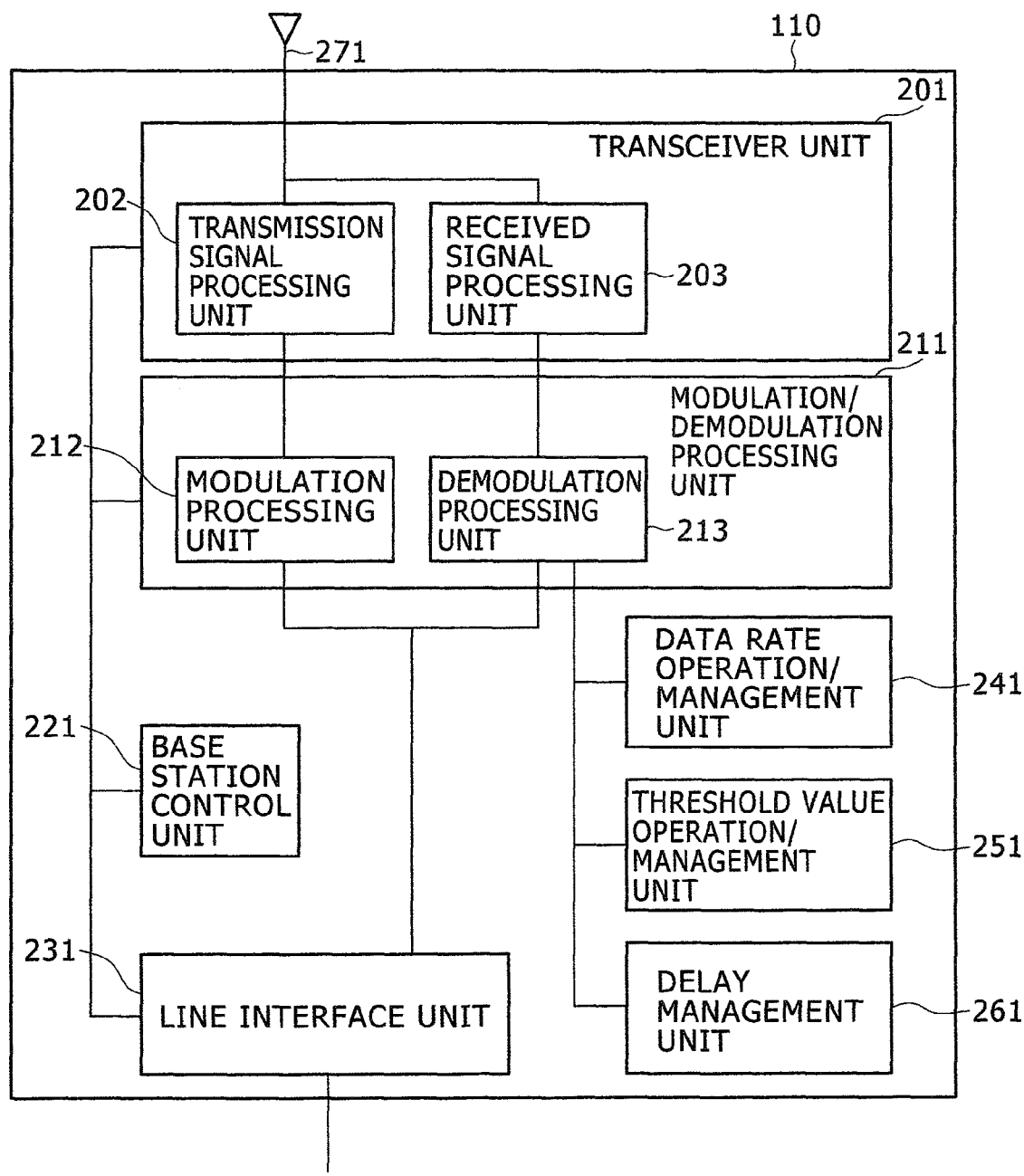
FIG. 4 is a functional block diagram of a wireless base station.

With reference to FIG. 4, a configuration of the wireless base station will be described. Here, FIG. 4 is a functional block diagram of the wireless base station. In FIG. 4, the wireless base station 110 includes a wireless signal transceiver unit 201, a modulation/demodulation processing unit 211, a base station control unit 221, a line interface unit 231, a data rate operation/management unit 241, a threshold value operation/management unit 251, a delay management unit 261, and an antenna 271.

The wireless signal transceiver unit 201 includes a received signal processing unit 203 which receives a wireless signal from the terminal with the antenna 271 to be converted into a digital signal, and a transmission signal processing unit 202 which converts a digital signal into a wireless signal to be transmitted from the antenna 271.

The modulation/demodulation processing unit 211 includes a demodulation processing unit 213 which demodulates the digital signal converted by the received signal processing unit 203, and a modulation processing unit 212 which modulates the digital signal to be transmitted to the terminal in accordance with the wireless environment of the terminal. The line interface unit 231 is an interface with the IP-SW 130. The base station control unit 221 has monitoring and controlling functions of the wireless base station 110.

The data rate operation/management unit 241 operates a time-averaged data rate for each terminal, and stores and manages the same. The threshold value operation/management unit 251 performs a threshold value operation/determination for each terminal by using the average value stored in the data rate operation/management unit and a current data rate. The threshold value operation/management unit 251 performs the following threshold value operation:

$$Th = Ri/Ri\_ave \quad \text{(Formula 1)}$$

where $Ri\_ave$ represents an average data rate of a terminal i, $Ri$ represents a current data rate, and $Th$ represents a threshold value.

In the case where the current value $Ri$ continuously falls below the average value $Ri\_ave$ ($Th<1$), the delay management unit 261 assumes that the wireless environment of the terminal i deteriorates. The delay management unit 261 monitors the threshold value operation/management unit 251 to manage the delay of the accommodated terminal.

Figure 5:
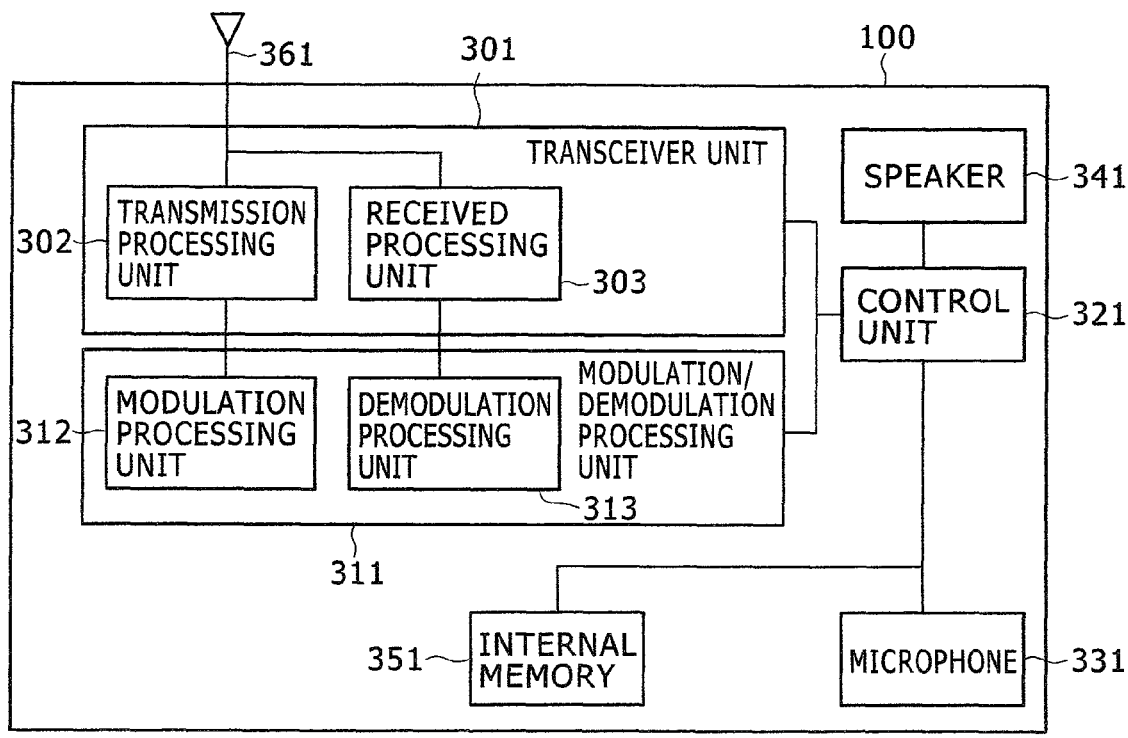
FIG. 5 is a functional block diagram of a terminal.

With reference to FIG. 5, a configuration of the terminal will be described. Here, FIG. 5 is a functional block diagram of the terminal. In FIG. 5, the terminal 100 includes an antenna 361, a transceiver unit 301, a modulation/demodulation processing unit 311, a control unit 321 which controls the entire terminal 100, an internal memory 351, a speaker 341, and a microphone 331. Further, the transceiver unit 301 includes a transmission processing unit 302 and a reception processing unit 303. Further, the modulation/demodulation processing unit 311 includes a modulation processing unit 312 and a demodulation processing unit 313.

Referring to FIG. 3, there will be described a case in which the terminals 100-1 and 100-2 perform VoIP communications using the 1×EV-DO system 500. The terminals 100-1 and 100-2 notify the base station 110 of wireless environment information as a data rate control signal, irrespective of presence or absence of data communications when they are located within service areas of the wireless base stations 110-1 and 110-2.

The terminals 100-1 and 100-2 start the VoIP communications from the service area of the wireless base station 110-1 and the service area of the wireless base station 110-2, respectively.

In the terminal 100-2, a voice signal is converted from voice data into voice packets by digital signal processing of the modulation processing unit 312, and the voice packets are transmitted to the wireless base station 110-2 while being superimposed on a wireless signal by the transmission processing unit 302. The wireless signal is converted into the voice packets by the received signal processing unit 203 of the wireless base station 110-2, and the voice packets are demodulated into the voice data by the demodulation processing unit 213. Then, the voice data is transmitted to the line interface unit 231 of the wireless base station 110-1 through the line interface unit 231, the IP-SW 130-2, the Internet 150, and the IP-SW 130-1.

The data received by the line interface unit 231 of the wireless base station 110-1 is modulated into packet data in the modulation processing unit 212 in accordance with the data rate notified from the terminal 100-1, and is divided into slots. The data which is divided into slots is superimposed on a wireless signal by the transmission signal processing unit 202 to be transmitted to the terminal 100-1. The wireless signal received by the terminal 100-1 is converted into voice packets by the reception processing unit 303, and the voice packets are converted into the voice data by the demodulation processing unit 313, so that the voice signal reaches through the speaker 341.

Hereinafter, an explanation will be given focusing on the wireless base station 110-1 and the terminal 100-1.

The terminal 100-1 notifies the wireless base station 110-1 of wireless environment information as a data rate control signal, irrespective of presence or absence of data communications when the terminal 100-1 is located within the service area of the wireless base station 110-1. The wireless base station 110-1 operates the average value $R1\_ave$ (here, i=1) using the received data rate value with the data rate operation/management unit 241, and stores the same.

In accordance with the data rate notification from the terminal 100-1, the modulation processing unit 212 in the wireless base station 110-1 modulates voice packets Y1, Y2, and so on to be transmitted to the terminal 100-1 so as to be divided into slots. If a data rate of 76.8 kbits/s is required, the voice packets Y1, Y2, and so on are transmitted in the order from a slot Y1-1 to a slot Y1-8, from a slot Y2-1 to a slot Y2-8, and so on.

Here, a threshold value operation is performed using (Formula 1) with the average value $R1\_ave$ stored in the data rate operation/management unit 241 and the current data rate $R1$.

In the case where the current value R1 during the data communications continuously falls below R1_ave (Th<1) and the wireless environment of the terminal 100-1 possibly deteriorates, the delay management unit 261 skips and discards the voice packets to be modulated. When the threshold value Th is 1.0 or larger, the delay management unit 261 does not perform the skipping process. When the threshold value Th is 0.5 or larger and smaller than 1.0, the delay management unit 261 performs one skipping process for five packets. When the threshold value Th is 0.5 or smaller, the delay management unit 261 performs one skipping process for three packets. Such a skipping process of the packets reduces delay. Further, although the quality of voice deteriorates, Enhanced Variable Rate Codec (EVRC) is used as voice codec, so that communications are possible without causing continuous interruptions of voice. Further, the slots which are supposed to be transmitted become available by the skipping of packets, so that other users can use the slots and the number of terminals to be accommodated in the base stations is increased.

[Second Embodiment]

The terminal 100-1 notifies the base station 110-1 of wireless environment information as a data rate control signal, irrespective of presence or absence of data communications when the terminal 100-1 is located within the service area of the wireless base station 110-1.

The wireless base station 110-1 operates the average value R1_ave (i=1) using the received data rate value with the data rate operation/management unit 241, and stores the same.

In accordance with the data rate requirement from the terminal 100-1, the modulation processing unit 212 in the wireless base station 110-1 modulates voice packets Y1, Y2, and so on to be transmitted to the terminal 100-1 so as to be divided into slots. If a data rate of 76.8 kbits/s is required, the voice packets Y1, Y2, and so on are divided into slots Y1-1 to Y1-8, Y2-1 to Y2-8, and so on by the modulation processing unit 212, and are transmitted to the terminal 100-1 through the transmission signal processing unit 202.

The terminal 100-1 allows the demodulation processing unit 313 therein to demodulate the packet Y1 using the slot Y1-1. If the packet Y1 can be demodulated, ACK is transmitted to the wireless base station 110-1. If not, NAK is transmitted to the wireless base station 110-1. In the case where ACK is returned from the terminal 100-1, the wireless base station 110-1 transmits Y2-1 without transmitting Y1-2. In the case where NAK is returned, the wireless base station 110-1 transmits the next slot Y1-2. The terminal 100-1 demodulates the packet Y1 using the slots Y1-1 and Y1-2. If the packet Y1 can be demodulated, ACK is returned. If not, NAK is returned. In the case of ACK, the wireless base station 110-1 transmits a slot Y2-1. In the case of NAK, the wireless base station 110-1 transmits the next slot Y1-3. The terminal 100-1 demodulates the packet Y1 using the slots Y1-1, Y1-2 and Y1-3. If the packet Y1 can be demodulated, ACK is returned. If not, NAK is returned. In the case of ACK, the wireless base station 110-1 transmits the slot Y2-1. In the case of NAK, the wireless base station 110-1 transmits the next slot Y1-4. The above-described procedure is performed up to a slot Y1-16 until the packet Y1 can be demodulated.

Here, a threshold value operation is performed using (Formula 1) with the average value R1_ave stored in the data rate operation/management unit 251 in the wireless base station 110-1 and the current data rate R1. In the case where the current value R1 during the data communications continuously falls below R1_ave and the wireless environment of the terminal 100-1 possibly deteriorates, the wireless base station 110-1 does not transmits the next slot even when NAK is returned from the terminal 100-1, but transmits the slot Y2-1 by terminating at the slot Y1-5.

By skipping the slots, the quality of voice at the skipped parts deteriorates. However, delay is reduced. In addition, voice is not continuously interrupted and the connection is not cut, so that communications are possible. Further, the slots which are supposed to be transmitted can be assigned to other users by the skipping of slots, so that the number of terminals to be accommodated is increased.

[Third Embodiment]

Figure 6:
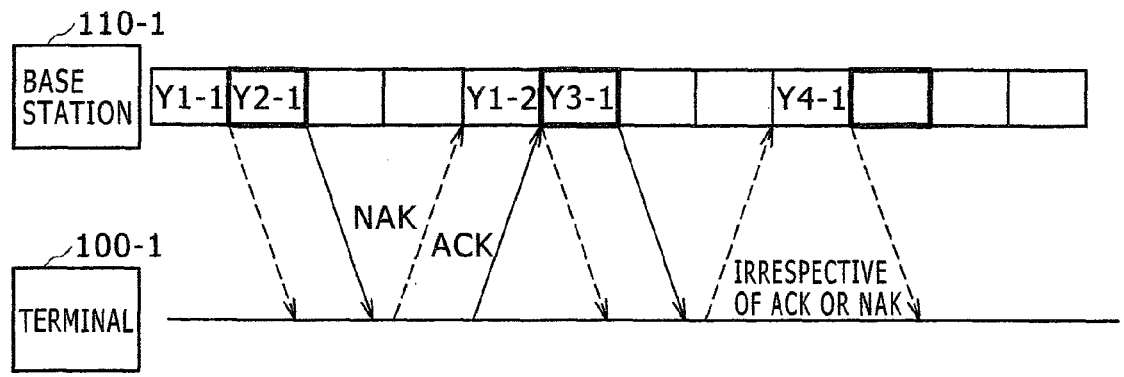
FIG. 6 is a diagram for explaining slot assignment.

With reference to FIG. 6, a third embodiment will be described. Here, FIG. 6 is a diagram for explaining slot assignment. The third embodiment is an embodiment in which slots Y1-1 and Y2-1 generated from different voice packets are continuously transmitted.

In FIG. 6, the data transmitted from the wireless base station 110-1 is demodulated from the slot Y1-1 to the packet Y1 at the demodulation processing unit 313 in the terminal 100-1. If the packet Y1 can be demodulated, the terminal 100-1 transmits ACK to the wireless base station 110-1. If not, the terminal 100-1 transmits NAK to the wireless base station 110-1. Here, it is assumed that the packet Y1 can not be demodulated, so that the terminal 100-1 transmits NAK.

Next, the terminal 100-1 demodulates the packet Y2 using the slot Y2-1 transmitted right after the slot Y1-1. If the packet Y2 can be demodulated, the terminal 100-1 transmits ACK to the wireless base station 110-1. If not, the terminal 100-1 transmits NAK to the wireless base station 110-1. Here, it is assumed that the packet Y2 can be demodulated, so that the terminal 100-1 transmits ACK.

Next, the wireless base station 110-1 transmits Y1-2 because the transmission result of the slot Y1-1 is NAK. The terminal 100-1 demodulates the packet Y1 using the slots Y1-1 and Y1-2. If the packet Y1 can be demodulated, the terminal 100-1 transmits ACK. If not, the terminal 100-1 transmits NAK. Further, the wireless base station 110-1 transmits Y3-1 because the transmission result of the slot Y2-1 is ACK.

Here, since the packet Y2 that is a sequence subsequent to the packet Y1 can be demodulated, the wireless base station 110-1 terminates the transmission process of the packet Y1 irrespective of ACK or NAK of the demodulation result after transmission of the slot Y1-2, and assigns and transmits a slot Y4-1 that is a slot of another packet.

In the case where the packet Y2 can be demodulated prior to the packet Y1 that is not demodulated, the terminal 100-1 discards the slots Y1-1 and Y1-2.

Accordingly, although the quality of voice deteriorates, delay is reduced. Further, the slots which are supposed to be transmitted can be assigned to other users, so that the number of terminals to be accommodated is increased.

According to the present embodiments, delay can be reduced in VoIP communications, and the number of terminals accommodated in the base station can be increased.

What is claimed is:

1. A base station in which a terminal is accommodated and the terminal is voice communicated with another terminal by VoIP, the base station comprising:
  a data rate operation/management unit which operates and stores a time-averaged data rate Rave of the terminal;
  a threshold value operation/management unit which obtains a current communication data rate R of the terminal to operate and store R/Rave; and
  a delay management unit which determines whether delay occurs or not on the basis of comparison of the R/Rave to a threshold level Th, and controls to reduce the delay, wherein the base station assigns voice packets to a plurality of slots and transmits the plurality of slots to a terminal, wherein a number of the slots is determined by a data rate for the terminal, and wherein the delay management unit, in a case where the delay is determined to occur, discards one or more voice packet to be modulated or one or more slot to be transmitted according to a predetermined discarding scheme, to reduce the delay.

2. The base station according to claim 1, wherein the delay management unit performs one skipping process for every five voice packets or one skipping process for every three voice packets, dependent on the R/Rave.

3. The base station according to claim 1, wherein the delay management unit, after transmitting a part of slots which store a modulated voice packet, terminates transmission of a remainder of the slots for reducing delay.

4. The base station according to claim 1, wherein the base station continuously transmits slots Y1-1 and Y2-1 generated from different Y1 and Y2 voice packets, and wherein when the terminal can receive the Y2 voice packet first, the delay management unit terminates transmission of the slots of the Y1 voice packet.

\* \* \* \* \*